United States Patent [19]

Ridge et al.

[11] Patent Number: 5,179,824
[45] Date of Patent: Jan. 19, 1993

[54] DISPOSABLE GRASS CATCHER

[76] Inventors: Ivo B. Ridge, 5805 Old Ranch Rd., Riverside, Calif. 92504; George Spector, 233 Broadway Rm. 3815, New York, N.Y. 10007

[21] Appl. No.: 736,423

[22] Filed: Jul. 26, 1991

[51] Int. Cl.⁵ ............................................. A01D 34/70
[52] U.S. Cl. ..................................... 56/202; 56/320.2
[58] Field of Search ............ 56/202, 199, 203, 320.1, 56/320.2, DIG. 18

[56] References Cited

U.S. PATENT DOCUMENTS

| | | | |
|---|---|---|---|
| 3,499,275 | 3/1970 | Lozen | 56/202 |
| 3,611,685 | 10/1971 | Allina | 56/202 |
| 3,881,304 | 5/1975 | Lempke | 56/202 |
| 3,995,414 | 12/1976 | Kerr et al. | 56/202 |
| 4,377,063 | 3/1983 | Leaphart | 56/202 |
| 4,747,259 | 5/1988 | Kline et al. | 56/202 |
| 4,989,400 | 2/1991 | Wark | 56/202 |
| 5,003,758 | 4/1991 | Bernstein | 56/202 |

*Primary Examiner*—Terry Lee Melius

[57] ABSTRACT

An improved grass catcher is provided for a lawn mower having a housing with a grass discharge area, and a U-shaped handle. The grass catcher consists of an adapter having a flange at one end and another end attachable to the grass discharge area of the housing. A disposable bag has a mouth mountable to the flange of the adapter so that the bag can catch cut grass travelling through the grass discharge area of the housing. A mechanism is provided for supporting the disposable bag from the handle of the lawn mower so that the disposable bag will not drag on the ground surface when a person is operating the lawn mower.

1 Claim, 1 Drawing Sheet

DISPOSABLE GRASS CATCHER

BACKGROUND OF THE INVENTION

The instant invention relates generally to lawn mower grass catchers and more specifically it relates to an improved grass catcher for a lawn mower which provides a disposable bag to receive grass clippings from the lawn mower.

There are available various conventional lawn mower grass catchers which do not provide the novel improvements of the invention herein disclosed.

SUMMARY OF THE INVENTION

A primary object of the present invention is to provide an improved grass catcher for a lawn mower that will overcome the shortcomings of the prior art devices.

Another object is to provide an improved grass catcher for a lawn mower in which an adapter attached to the grass discharge area of the mower housing and a disposable bag attached to the adapter and supported from the mower handle will receive grass clippings so as to be thrown away when full.

An additional object is to provide an improved grass catcher for a lawn mower in which the adaptor can be attached to all types of lawn mowers presently on the market.

A further object is to provide a disposable bag grass catcher for a lawn mower that is simple and easy to use.

A still further object is to provide a disposable bag grass catcher for a lawn mower that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
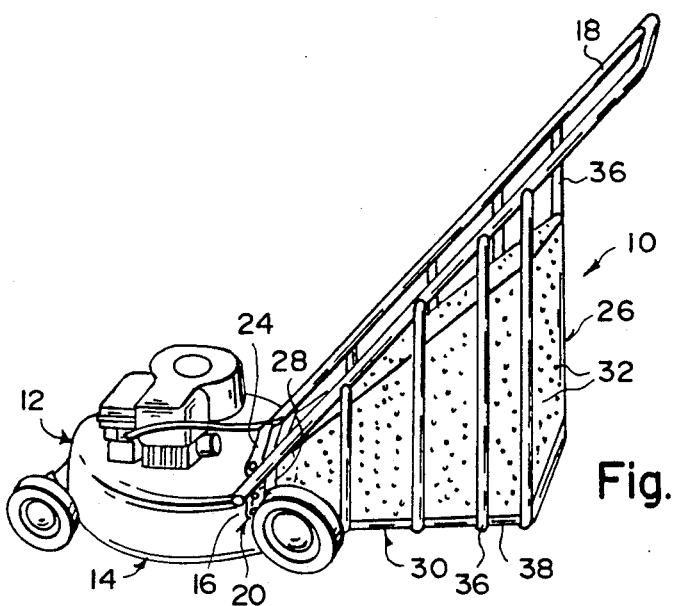
FIG. 1 is a perspective view of a lawn mower with the grass catcher of the present invention attached thereto.
Figure 2:
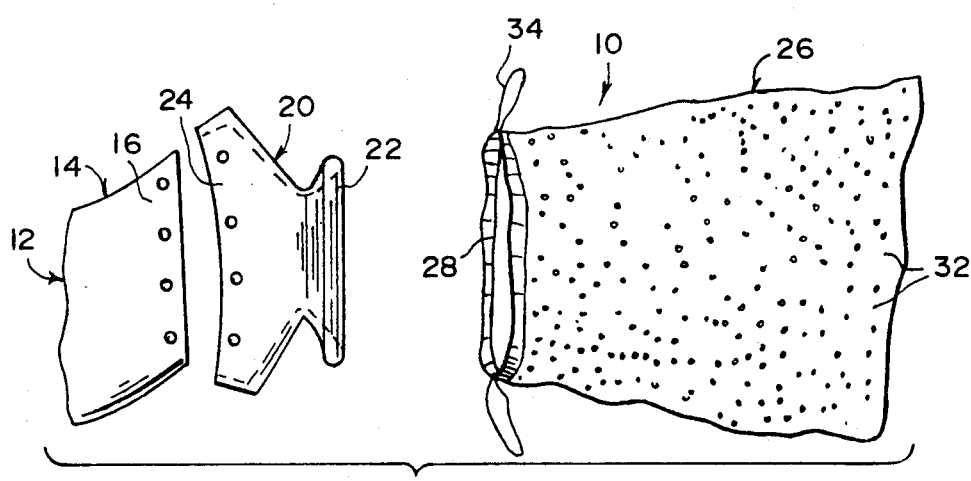
FIG. 2 is an exploded side view of the adapter and disposable bag removed from the housing.
Figure 3:
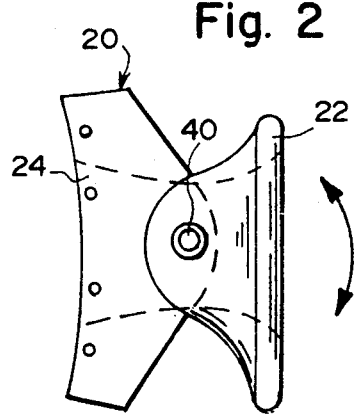
FIG. 3 is a side view of a modified adapter having an adjustable neck for positioning the grass catcher at an appropriate position above the ground surface.
Figure 4:
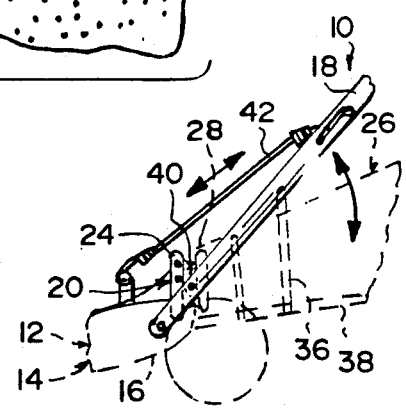
FIG. 4 is a diagrammatic side view showing the modified adapter and an elastic member extending between the handle and housing so as to keep the handle and disposable bag elevated when mowing and for lowering the grass catcher to a convenient position to remove the bag.

Turning now descriptively to the drawings, in which similar reference characters denote similar elements throughout the several views, the Figures illustrate an improved grass catcher 10 for a lawn mower 12 having a housing 14 with a grass discharge area 16, and a U-shaped handle 18. The grass catcher 10 consists of an adapter 20 having a flange 22 at one end and another end 24 attachable to the grass discharge area 16 of the housing 14. A disposable bag 26, having a mouth 28 is mountable to the flange 22 of the adapter 20 so that the bag 26 can catch cut grass travelling through the grass discharge area 16 of the housing 14 and adapter 20. A mechanism 30 is for supporting the disposable bag 26 from the handle 18 of the lawn mower 12 so that the disposable bag 26 will not drag on the ground surface when a person is operating the lawn mower 12.

The disposable bag 26 has a plurality of perforations 32 to allow air to pass therethrough while allowing the retainment of the cut grass therein. A pull string 34 is about the mouth 28 of the disposable bag 26 for holding the mouth 28 onto the flange 22 and for sealing the disposable bag 26 when the disposable bag is full of the cut grass and removed from the adapter 20.

The supporting mechanism 30 includes a plurality of support rods 36 spaced apart with each affixed at one end to the U-shaped handle 18 to extend downwardly on either side of the disposable bag 26. A platform 38 is affixed to the other ends of the support rods under the disposable bag 26 so that the disposable bag can rest upon the platform 38.

The adapter 28 can have an adjustable neck 40 so as to position the grass catcher 10 at an appropriate position above the ground surface. An elastic member 42 extends between the handle 8 and the housing 14 so as to keep the handle 18 and the grass catcher 10 elevated when mowing and for lowering the grass catcher 10 to a convenient position to remove the disposable bag 26 therefrom.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An improved grass catcher for a lawn mower having a housing with a grass discharge area, and a U-shaped handle, said grass catcher comprising:
   a) an adapter having a flange at one end and another end attachable to the grass discharge area of the housing;
   b) a disposable bag having a mouth mountable to the flange of said adapter so that said bag can catch cut grass travelling through the grass discharge area of the housing and said adapter;
   c) means for supporting said disposable bag from the handle of the lawn mower so that said disposable bag will not drag on the ground surface when a person is operating the lawn mower;
   d) said disposable bag having a plurality of perforations to allow air to pass therethrough while allowing the retainment of the cut grass therein;
   e) a pull string about the mouth of said disposable bag for holding the mouth onto the flange and for sealing said disposable bag when said disposable bag is full of the cut grass and removed from said adapter; wherein said supporting means includes:
   f) a plurality of support rods spaced apart with each affixed at one end to the U-shaped handle to extend downwardly on either side of said disposable bag;

g) a platform affixed to the other ends of said support rods under said disposable bag so that said disposable bag can rest upon said platform;

h) said adapter having an adjustable neck so as to position said grass catcher at an appropriate position above the ground surface; and i) an elastic member extending between the handle and the housing so as to keep the handle and said grass catcher elevated when mowing and for lowering said grass catcher to a convenient position to remove said disposable bag therefrom.

* * * * *